US005775588A

United States Patent [19]

Hallström et al.

[11] Patent Number: 5,775,588

[45] Date of Patent: Jul. 7, 1998

[54] SPRAY DRYING PLANT WITH BY-PASS NOZZLE

[75] Inventors: Anders Hallström, Espergærde; Nicolaj Stahnke, Gentofte; Henrik Sønderby, Helsingør, all of Denmark

[73] Assignee: APV Anhydro AS, Søborg, Denmark

[21] Appl. No.: 635,897

[22] PCT Filed: Oct. 25, 1994

[86] PCT No.: PCT/DK94/00392

§ 371 Date: May 15, 1996

§ 102(e) Date: May 15, 1996

[87] PCT Pub. No.: WO95/11758

PCT Pub. Date: May 4, 1995

[30] Foreign Application Priority Data

Oct. 25, 1993 [DK] Denmark .......... 1195/93

[51] Int. Cl.[6] .......... B23K 27/00

[52] U.S. Cl. .......... 239/127; 239/463

[58] Field of Search .......... 239/461, 124, 239/127, 463

[56] References Cited

U.S. PATENT DOCUMENTS

| | | | |
|---|---|---|---|
| 2,567,818 | 9/1951 | MacCracken . | |
| 3,019,990 | 2/1962 | Campbell . | |
| 3,547,093 | 12/1970 | Sherman | 239/127 X |
| 4,121,085 | 10/1978 | Diemer et al. | 239/119 X |
| 4,186,877 | 2/1980 | Wilcox et al. . | |

FOREIGN PATENT DOCUMENTS

| | | | |
|---|---|---|---|
| 913222 | 10/1953 | Germany | 239/127 |
| 102954 | 11/1941 | Sweden | 239/127 |

*Primary Examiner*—Kevin Weldon
*Attorney, Agent, or Firm*—Leydig, Voit & Mayer, Ltd.

[57] ABSTRACT

A spray drying system having a whirl chamber nozzle with a bypass and for atomization of a liquid. The whirl chamber of the nozzle has a central discharge orifice, from which a ring-shaped bypass passage extends radially outwards. This ensures that substantially no air enters the bypass from the whirl chamber, while providing acceptably low flow growth values.

5 Claims, 2 Drawing Sheets

SPRAY DRYING PLANT WITH BY-PASS NOZZLE

TECHNICAL FIELD OF THE INVENTION

The present invention concerns a whirl chamber nozzle for atomizing a liquid which is introduced tangentially into the chamber at its outer periphery, comprising a bypass which extends away from the whirl chamber via a central discharge orifice.

BACKGROUND OF THE INVENTION

There has been a long-felt need for the possibility of using whirl chamber nozzles with bypass in connection with spray drying systems, where solid particles remain when an atomized liquid solution or suspension is ejected into a container at a particularly high temperature, causing the liquid portion to evaporate and the solid particles to remain. Such spray drying processes find widespread use for the production of powders in chemical, pharmaceutical, food and related industries.

In particular, the need is present when operation of a spray drying system is initiated and stopped, where the flow of the ejected atomized liquid amount from the known whirl chamber nozzles without bypass can be changed only by changing the pump pressure, resulting in undesired changes in the atomization state and in particular the particle size.

In relation to whirl chamber nozzles without bypass, whirl chamber nozzles with bypass involve the great advantage that the flow of the ejected, atomized liquid amount can easily be controlled by changing the flow of the liquid amount which flows back via the bypass, without it being necessary to change the pressure in the conduit from the feed pump, as is the case with whirl chamber nozzles without bypass, where the feed pump pressure has to be changed when the flow of the ejected, atomized liquid amount is to be changed. This provides the great advantage that the liquid ejection velocity and thereby the atomization degree, i.e. the drop size remain substantially unchanged when the flow of the ejected, atomized liquid amount is changed. This is not the case with whirl chamber nozzles without bypass, where the flow of the ejected, atomized liquid amount can be changed only by changing the pump pressure, which undesirably causes also the atomization degree and thus the drop size to be changed.

To a person skilled in the field of nozzles, the maximum, so-called turndown ratio is defined as the ratio of the maximally acceptable flow to the minimally acceptable flow of atomized liquid amount ejected. This ratio is very small, i.e. less than 2:1, for whirl chamber nozzles without bypass. Whirl chamber nozzles with bypass frequently have a turndown ratio above 5:1, which may be assumed to be advantageous for use in spray drying systems.

On the other hand, it is a great problem of whirl chamber nozzles with bypass that the total flow of liquid to the nozzle increases substantially when the amount of liquid passing through the bypass increases, i.e. when the turndown ratio is increased. This phenomenon is called flow growth. In the known whirl nozzles with bypass a flow growth of 30–50% is not unusual at a turndown ratio of 3:1. When the flow of the ejected, atomized liquid amount is reduced by opening a valve in the bypass, the total liquid flow supplied to the nozzle thus increases (assuming constant pressure at the nozzle). The feed pump must hereby be undesirably overdesigned in capacity.

Another problem making it impossible to use the known whirl chamber nozzles with bypass directly in connection with spray drying systems, is that the liquid whirls in the whirl chamber create an air core which extends through the nozzle orifice and axially through the whirl chamber. When the bypass valve opens, air from the air core will be drawn into the bypass conduit in an uncontrolled manner. This is extremely unfortunate in connection with spray drying systems for several reasons. It should be mentioned that there are also systems for controlled injection of air.

If the bypass conduit extends back to the feed pump, the entering air may cause mechanical problems and fluctuations in the pump pressure. If the bypass conduit extends back to the liquid feed container, entering air may cause foaming of specific products, which cannot be accepted at all in case of food and in particular milk products. The entering air may also be entrained in the spray dried particles, thereby causing low density and other undesired powder properties. It should be mentioned that the use of the known whirl nozzles for spray drying systems have also involved problems of nozzle clogging, in particular when highly viscous liquids are fed. Accordingly, there is also a need for a nozzle which, with a larger nozzle diameter, can work in a controlled manner without air entrapment so that the nozzle orifice does not clog easily.

U.S. Pat. No. 4,186,877 discloses a whirl nozzle with bypass of the type mentioned in the opening paragraph, which is used in particular as a fuel nozzle. The bypass of this whirl nozzle comprises a central, circular passage which extends axially away from the whirl chamber with a uniform cross-sectional area. This embodiment provides a relatively low flow growth, but results in an unacceptably high air entrapment in the system, which, however, may be prevented by an increased diameter of the bypass passage. However, the flow growth increases hereby, which makes it impossible in practice to use this nozzle type in connection with spray drying systems.

Accordingly, none of the known whirl nozzles with bypass are available in an embodiment making them directly useful in spray drying systems.

The object of the present invention is therefore to provide a spray drying system having a whirl chamber nozzle with bypass, which, in use, exhibits a reduced tendency to flow growth in comparison with the known whirl nozzles with bypass and substantially without air being entrapped in the bypass.

BRIEF SUMMARY OF THE INVENTION

The spray drying system of the present invention is novel in that the bypass of the nozzle comprises a passage which extends away from the central discharge orifice with an increasing cross-sectional area. Accordingly, there is provided a particularly flexible and reliable spray drying system enabling a considerably better controlled spray drying process—seen in relation to what is possible in the known systems. It is hereby possible to use nozzles with whirl chambers and bypass in connection with spray drying systems, because the flow growth can be kept at an acceptably low level, substantially below 50%, while practically no air is entrapped in the bypass.

Further, it is possible to work in a "controlled" manner with nozzles having a larger nozzle diameter than has been possible in the past—which also involves less risk of clogging. During start/stop of spray drying systems it is hereby possible, in smaller systems, to work with a single nozzle having a larger nozzle diameter instead of two or more nozzles of reduced nozzle diameter like before, which are connected and closed, respectively, one by one.

The particularly strong whirl of liquid in the whirl chamber spreads to the bypass passage and expands, owing to the increasing cross-sectional area of said passage, in it and is decelerated in a centrifugal field. Owing to the presence of the centrifugal field in the bypass passage, air is prevented from leaving the whirl chamber and entering the bypass passage.

According to the invention, the passage of the nozzle may be provided as a ring-shaped slot which extends radially outwards, seen in relation to the central axis of rotation of the whirl chamber, so that the flow growth may be kept at a particularly low level. It has been found particularly expedient that the radial extent of the ring-shaped slot continues as an axial extent in the vicinity of the outer periphery of the whirl chamber, seen in the axial direction.

The spray drying system of the invention is particularly advantageous for the production of agrochemical, pharmaceutical, dye, pigment, resin, polymer and food products, such as in particular milk products and baby food.

The invention will be explained more fully below with reference to preferred embodiments and the drawing.

DETAILED DESCRIPTION OF THE PREFERRED EMBODIMENTS

Figure 1:
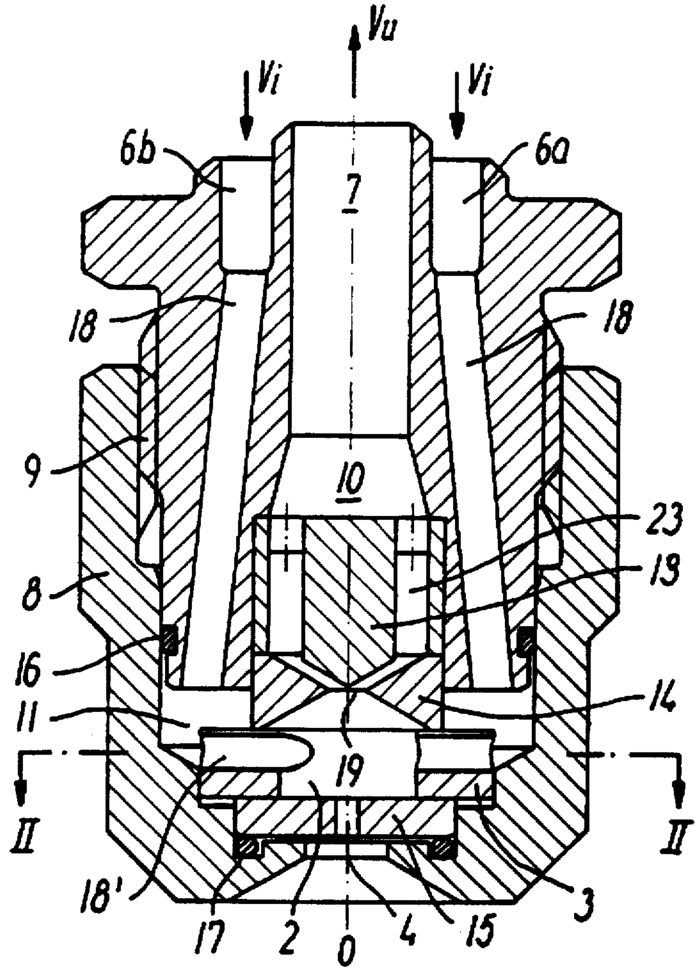
FIG. 1 shows an axial section of the spray drying chamber whirl nozzle with bypass comprising a ring-shaped passage which extends radially outwards.

The whirl chamber nozzle 1 shown in FIG. 1 for atomizing a liquid comprises a whirl chamber 2 into which the liquid is introduced tangentially at the outer periphery of the whirl chamber 2.

The whirl chamber 2 has a shape known per se and may be defined within a circular disc 3 which is embedded in the nozzle 1 at its nozzle mouth 4. The operating pressure is up to 400 bars in the whirl chamber 2.

The whirl chamber nozzle 1 comprises an upper tubular part 5 having a radial or, as shown, two axial inlets 6*a*, *b* for the liquid to be atomized, and an axial outlet 7 for a bypass provided in the whirl chamber nozzle 1.

The whirl chamber nozzle 1 moreover comprises a lower tubular part 8 which is joined with the upper tubular part 5 by a threaded connection 9. The tubular parts 5 and 8 comprise axial bores 10, 11. It should be mentioned that the central axis of rotation of the whirl chamber 2 coincides with axis of symmetry O of the bores 10, 11.

Seen from above, the axial bore 10 accommodates a tubular part 13, a ring-shaped part 14, the circular disc 3, and a circular disc 15, all of which are clamped together between the upper and lower tubular parts 5 and 8 of the nozzle housing. A sealing ring 16 is provided between the upper and lower tubular parts 5 and 8, and a sealing ring 17 is provided between the disc 15 and the lower tubular part 8.

Figure 2:
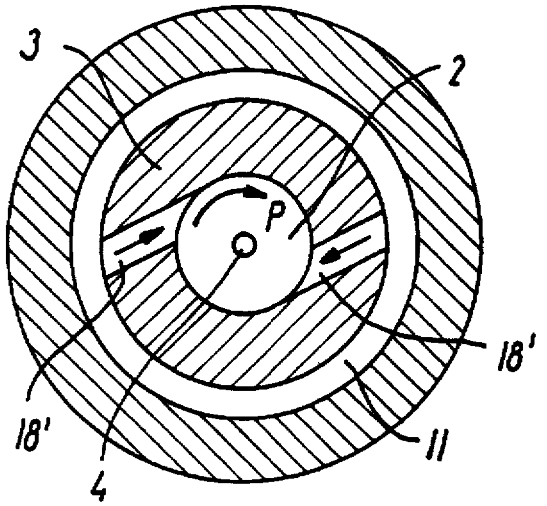
FIG. 2 is a cross-section along the line II—II through the whirl chamber of the nozzle shown in FIG. 1.

The liquid, which flows into the inlets 6*a*, *b* in the direction of the arrows $V_i$ at a high feed pressure, flows further on through substantially axial passages 18, which, however, are drilled slightly obliquely through the upper part 5 in the shown embodiment. Then, the liquid flows further on tangentially into the whirl chamber 2 via tangential inlet bores 18', see FIG. 2. Extremely strong whirls are created in the whirl chamber 2 in the direction of the arrow P, following which the liquid flows out via the nozzle mouth 4 in the embedded disc 15 and is atomized outside the nozzle.

The embedded ring-shaped part 14 comprises a central discharge orifice 19 for the bypass of the whirl chamber nozzle 1. In the embodiment shown in FIG. 1, the discharge orifice 19 is defined by a sharp edge, which, however, will gradually be worn and rounded slightly.

Figure 3:
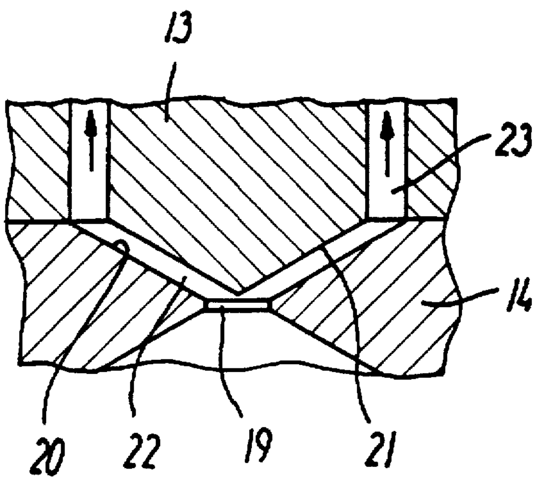
FIG. 3 shows part of another embodiment of the ring-shaped, radial bypass passage of the nozzle on an enlarged scale and in the same manner as in FIG. 1.

As shown in greater detail in FIG. 3, in which the discharge orifice 19, in contrast to FIG. 1, is now in the nature of a tubular orifice, the ring-shaped part 14 comprises an internal cone-shaped face 20, and the subsequent tubular part 13 comprises a lower, external cone-shaped face 21, said cone-shaped faces 20, 21 defining between them a ring-shaped slot 22 which extends radially outwards from the central discharge orifice 19, seen in relation to the central axis of rotation O of the whirl chamber 2. The ring-shaped slot 22 has a radial course to a point in the vicinity of the outer periphery of the whirl chamber 2, seen in the axial direction, and merges into an axial course of passages 23 in the tubular part 13.

The axial passages 23 merge into the central, axial bore 10.

Figure 4:
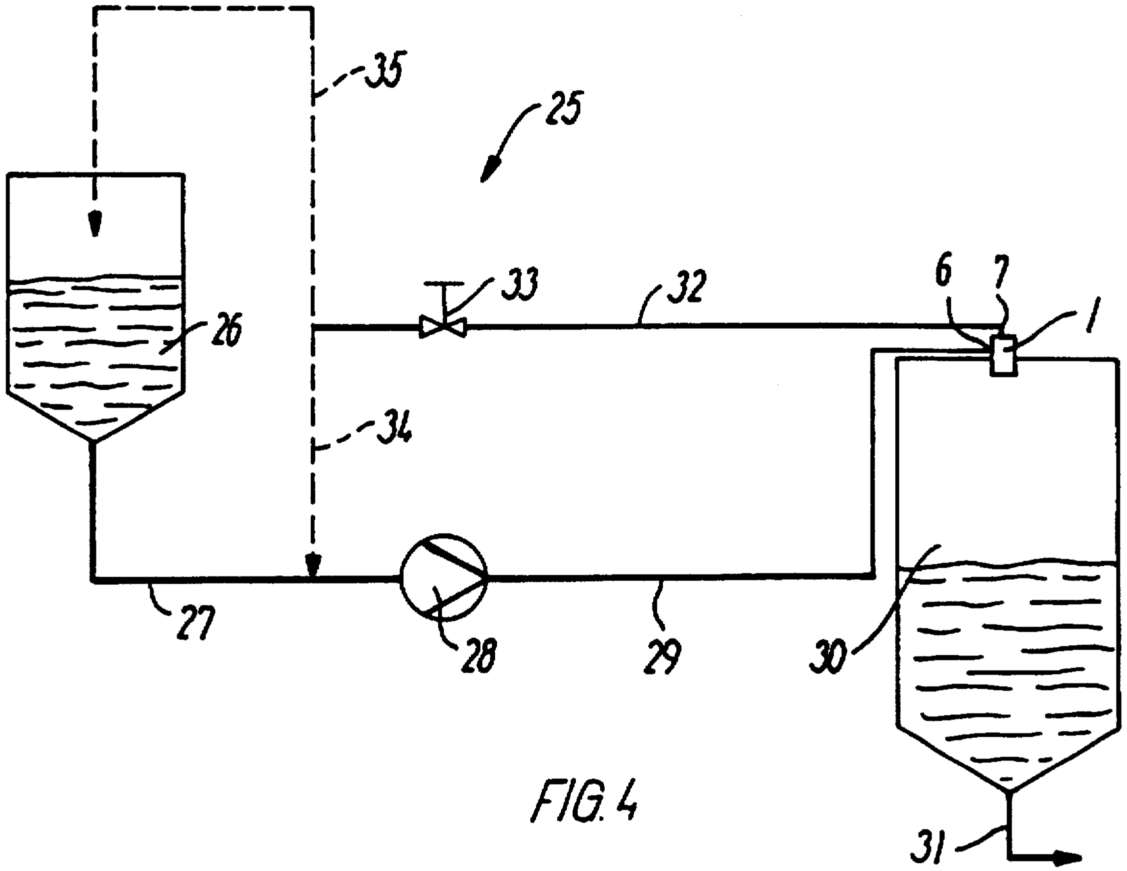
FIG. 4 schematically shows part of the spray drying system.

The whirl chamber nozzle 1 of the present invention may be used particularly advantageously in a spray drying system 25 as shown in FIG. 4. The system 25 comprises a storage tank 26 for the liquid to be atomized, which may e.g. be a milk mixture, if the plant is adapted to produce spray-dried milk powder. The storage container 26 is connected via a conduit 27 with a feed pump 28, which is connected with the liquid inlet 6*a*, 6*b* of the nozzle 1 via a conduit 29. The nozzle 1 is preferably arranged upwardly in a spray drying chamber 30 for the milk powder. The milk powder may be passed further on from the bottom of the chamber 30 via a passage 31 for subsequent treatment. The outlet 7 of the bypass of the nozzle 1 may be connected via a conduit 32 with a control valve 33, which may either be connected in return relationship with the inlet of the feed pump 28 via a subsequent conduit 34 or may be connected in return relationship with the storage container 26 via a conduit 35.

While maintaining a substantially constant feed pump pressure, the control valve 33 is adjusted until the desired return flow of liquid in the bypass (the conduit 32) has been reached such that the ejected flow amount of atomized liquid through the nozzle mouth 4 is set to the desired level.

When the control valve 33 is open so that the liquid can pass through the bypass, the liquid passes from the whirl chamber 2 through the discharge orifice 19, further through the radial, ring-shaped slot 22, further through the axial passages 23, further through the axial bore 10 and leaves the nozzle 1 via the outlet 7.

Bypassing liquid maintains the strong whirl movement, which has been imparted to it in the whirl chamber, in the ring-shaped slot 22 and is decelerated in a centrifugal field with the increasing cross-sectional area of the radial extent of the slot 22. This prevents air from the whirl chamber 2 from entering the bypass passages 22, 23.

A form of "liquid lock" is established, counteracting ingression of air into the bypass. Further, the flow growth is kept at an acceptably low level. The whirl chamber nozzle of the present invention hereby lends itself particularly well for use in connection with spray drying systems, in particular for treatment of food products, such as spray drying of milk mixtures for milk powders, where, in particular, entrapment of air in the system cannot be accepted.

It should be mentioned that tests have been performed with a Delavan SDX whirl chamber nozzle comprising an SD whirl chamber and a nozzle orifice disc 15 called No. 67 having a nozzle orifice diameter of 1.7 mm. The nozzle 1 was provided with a bypass comprising a radial, ring-shaped slot and subsequent axial passages, as described above. The diameter of the outlet of the bypass from the whirl chamber was 3.0 mm. The feed pressure of the pump was set between 136 and 160 bars in the tests. In the tests, the liquid atomized in the nozzle was water.

When the flow amount of the ejected atomized water amount was set to 20% of the maximum discharge flow by regulation of the control valve, i.e. at a turndown ratio of 5:1, an acceptable flow growth of 46% and extremely low air entrapment in the system of just 2% were observed. These values are to be compared with flow growth values of up to 100% and air entrapment procentages of up to 25% which have been measured during tests with other embodiments of the bypass passages.

It should finally be mentioned that many modifications are possible without departing from the idea of the invention. For example, the nozzle may be constructed such that the width of the radial, ring-shaped slot of the bypass can be adjusted axially

We claim:

1. A spray drying system having a whirl chamber nozzle for atomization of a liquid which is introduced tangentially into the whirl chamber of the nozzle at its outer periphery, said whirl chamber nozzle comprising a bypass which extends away from the whirl chamber via a central discharge orifice, wherein said bypass is provided as a ring-shaped slot extending axially away from said central discharge orifice with an increasing cross-sectional area, said ring-shaped slot also extending radially outwards with its outermost periphery extending to a point in the vicinity of the outer periphery of the whirl chamber.

2. A spray drying system according to claim 1, wherein the radial course of the ring-shaped slot merges into an axial course of passages.

3. A spray drying system according to claim 2, wherein the ratio of the slot width of the ring-shaped slot to the diameter of the central discharge orifice is in the range from 1:1 to 1:25.

4. A method of spray drying a liquid, which method comprises the use of a whirl chamber nozzle for atomization of a liquid which is introduced tangentially into the whirl chamber of the nozzle at its outer periphery, said whirl chamber nozzle comprising a bypass which extends away from the whirl chamber via a central discharge orifice, wherein said bypass is provided as a ring-shaped slot extending axially away from said central discharge orifice with an increasing cross-sectional area, said ring-shaped slot also extending radially outwards with its outermost periphery extending to a point in the vicinity of the outer periphery of the whirl chamber.

5. The method according to claim 4, wherein the liquid to be spray dried is a milk mixture for production of spray dried milk powder.

* * * * *